United States Patent
Agashe et al.

(10) Patent No.: US 9,845,426 B2
(45) Date of Patent: Dec. 19, 2017

(54) HIGH-SALT GELLING COMPOSITIONS AND METHODS FOR WELL TREATMENT

(71) Applicant: Halliburton Energy Services, Inc., Houston, TX (US)

(72) Inventors: Snehalata Sachin Agashe, Pune (IN); Prajakta Ratnakar Patil, Pune (IN); Sushant Dattaram Wadekar, Mumbai (IN)

(73) Assignee: Halliburton Energy Services, Inc., Houston, TX (US)

( * ) Notice: Subject to any disclaimer, the term of this patent is extended or adjusted under 35 U.S.C. 154(b) by 49 days.

(21) Appl. No.: 14/912,843

(22) PCT Filed: Sep. 20, 2013

(86) PCT No.: PCT/US2013/060805
§ 371 (c)(1),
(2) Date: Feb. 18, 2016

(87) PCT Pub. No.: WO2015/041662
PCT Pub. Date: Mar. 26, 2015

(65) Prior Publication Data
US 2016/0194552 A1 Jul. 7, 2016

(51) Int. Cl.
*E21B 43/26* (2006.01)
*C09K 8/62* (2006.01)
*C09K 8/68* (2006.01)
*C09K 8/88* (2006.01)
*C09K 8/90* (2006.01)
*C09K 8/60* (2006.01)
*C09K 8/66* (2006.01)

(52) U.S. Cl.
CPC ............. *C09K 8/685* (2013.01); *C09K 8/602* (2013.01); *C09K 8/665* (2013.01); *C09K 8/887* (2013.01); *C09K 8/90* (2013.01); *E21B 43/26* (2013.01); *C09K 2208/24* (2013.01); *C09K 2208/26* (2013.01); *C09K 2208/30* (2013.01)

(58) Field of Classification Search
CPC .......... E21B 43/25; E21B 43/26; C09K 8/62; C09K 8/685; C09K 8/887; C09K 8/68
See application file for complete search history.

(56) References Cited

U.S. PATENT DOCUMENTS

| | | | |
|---|---|---|---|
| 4,861,500 A | 8/1989 | Hodge | |
| 5,979,555 A | 11/1999 | Gadberry et al. | |
| 6,239,183 B1 | 5/2001 | Farmer et al. | |
| 7,216,709 B2 | 5/2007 | McElfresh et al. | |
| 7,786,050 B2 * | 8/2010 | Parris | C09K 8/685 507/209 |
| 2005/0107503 A1 | 5/2005 | Couillet et al. | |
| 2005/0252658 A1 | 11/2005 | Willingham et al. | |
| 2007/0125542 A1 | 6/2007 | Wei et al. | |
| 2007/0167332 A1 | 7/2007 | Subramanian et al. | |
| 2008/0200353 A1 | 8/2008 | Dahayanake et al. | |
| 2011/0284225 A1 | 11/2011 | Lord et al. | |
| 2012/0129738 A1 | 5/2012 | Gupta et al. | |

FOREIGN PATENT DOCUMENTS

| | | |
|---|---|---|
| EP | 0799968 A2 | 10/1997 |
| WO | 2012/076567 A2 | 6/2012 |
| WO | 2012/080383 A2 | 6/2012 |
| WO | 2012/160008 A1 | 11/2012 |

OTHER PUBLICATIONS

International Preliminary Report on Patentability ssued in related PCT Application No. PCT/US2013/060805 dated Mar. 31, 2016, 11 pages.
Nasr-El-Din, H.A. et al., "Restoring the Injectivity of Water Disposal Wells Using a Viscoelastic Surfactant-Based Acid", Journal of Petroleum Science and Engineering, vol. 54, No. 1, 2006, pp. 10-24.
International Search Report and Written Opinion issued in related PCT Application No. PCT/US2013/060805 dated Jun. 12, 2014, 15 pages.
Blauch, M.E., "Developing Effective and Environmentally Suitable Fracturing Fluids Using Hydraulic Fracturing Flowback Waters", SPE Paper 131784, 2010 SPE Unconventional Gas Conference, Pittsburgh, PA, Feb. 23-25, 2010, 12 pages.
Shashkina, Julia A. et al., "Rheology of Viscoelastic Solutions of Cationic Surfactant—Effect of Added Associating Polymer", Langmuir, vol. 21 (2005), pp. 1524-1530.
Das, Prasanta, Sumit Konale, and Ramya Kothamasu. "Effect of salt concentration on base-gel viscosity of different polymers used in stimulation fluid systems." SPE/EAGE European Unconventional Resources Conference and Exhibition. 2014.

* cited by examiner

*Primary Examiner* — Catherine Loikith
(74) *Attorney, Agent, or Firm* — Craig W. Roddy; Baker Botts L.L.P.

(57) ABSTRACT

A fluid including: (i) a continuous aqueous phase, wherein the continuous aqueous phase has total dissolved solids in a concentration of at least 30,000 mg/l; (ii) an alkyl amido quaternary amine; (iii) a polymer, wherein the polymer is water-soluble or water-hydratable; and (iv) a crosslinker for the polymer. The continuous aqueous phase of the fluid can include a water source selected from the group consisting of flowback water, produced water, and any combination thereof. Methods include: (A) forming a fluid according to any of the various embodiments of the disclosure, and (B) introducing the fluid into a well. For example, the fluid can be used as a fracturing fluid for fracturing a treatment zone of a well.

19 Claims, 4 Drawing Sheets

HIGH-SALT GELLING COMPOSITIONS AND METHODS FOR WELL TREATMENT

CROSS-REFERENCE TO RELATED APPLICATION

The present application is a U.S. National Stage Application of International Application No. PCT/US2013/060805 filed Sep. 20, 2013, which is incorporated herein by reference in its entirety for all purposes.

TECHNICAL FIELD

The disclosure is in the field of producing crude oil or natural gas from subterranean formations. More specifically, the disclosure generally relates to fluids and methods for treating a well with a viscosified fluid, for example, in fracturing operations.

BACKGROUND

In the production of oil and gas, abundant quantities of water are produced. Sources of produced water can include water that may have been introduced into the subterranean formation as part of a well-completion or well-treatment process, water that may have been delivered as part of an injection-well driving process, formation water, and any mixture of any of these. For example, for every barrel of oil produced from a well, it is typical to also obtain about 10 barrels of produced water. Large quantities of flowback water and produced water continue to be disposed of as waste water, for example, by re-injecting the produced water into a disposal well. The produced water requires large storage capacity and creates a disposal problem in most of the cases, which ultimately contributes towards production cost.

The handling of huge quantities of produced or flowback water is major issue in oilfield industry. With the rising demand for potable water and freshwater, increasing public concern for the environment, and with the rising costs of obtaining potable water and freshwater, it would be desirable to be able to use lower quality water, such as flow back and produced water, in well treatments.

The produced water contains high concentrations of various dissolved salts, which adversely affect to the efficiency of viscosity-increasing agents, so it cannot be used "as it is" for preparing a fracturing fluid. Hence, due to the scarcity of fresh water, and the abundant availability of produced water at a well site, if it would be possible to make use of produced water for preparing fracturing fluids would be a more viable and economical alternative.

GENERAL DESCRIPTION OF EMBODIMENTS

A treatment fluid is disclosed that can utilize flowback or produced water containing total dissolved solids ("TDS") having greater than about 30,000 mg/l to about 150,000 mg/l. In some embodiments, the water can have greater than about 60,000 mg/l TDS, and in some embodiments, the water can have greater than about 100,000 mg/l TDS.

A combination of a category of cationic viscoelastic surfactant ("VES") and a crosslinked water-soluble polymeric viscosity-increasing agent can impart enhanced fluid viscosity to the fluid for its use as a fracturing fluid using produced water.

In general, a fluid is provided, the fluid including: (i) a continuous aqueous phase, wherein the continuous aqueous phase has total dissolved solids in a concentration of at least 30,000 mg/l; (ii) an alkyl amido quaternary amine; (iii) a polymer, wherein the polymer is water-soluble or water-hydratable; and (iv) a crosslinker for the polymer.

In various embodiments, the continuous aqueous phase of the fluid comprises a water source selected from the group consisting of flowback water, produced water, and any combination thereof.

The disclosure also provides methods of treating a well, the methods including: (A) forming a fluid according to any of the various embodiments of the disclosure, and (B) introducing the fluid into a well. For example, the fluid can be used as a fracturing fluid for fracturing a treatment zone of a well.

These and other embodiments of the disclosure will be apparent to one skilled in the art upon reading the following detailed description. While the disclosure is susceptible to various modifications and alternative forms, specific embodiments thereof will be described in detail and shown by way of example. It should be understood, however, that it is not intended to limit the disclosure to the particular forms disclosed.

BRIEF DESCRIPTION OF THE DRAWING

The accompanying drawing is incorporated into the specification to help illustrate examples according to a presently preferred embodiment of the disclosure.

DETAILED DESCRIPTION OF PRESENTLY PREFERRED EMBODIMENTS AND BEST MODE

Definitions and Usages

General Interpretation

Figure 1:
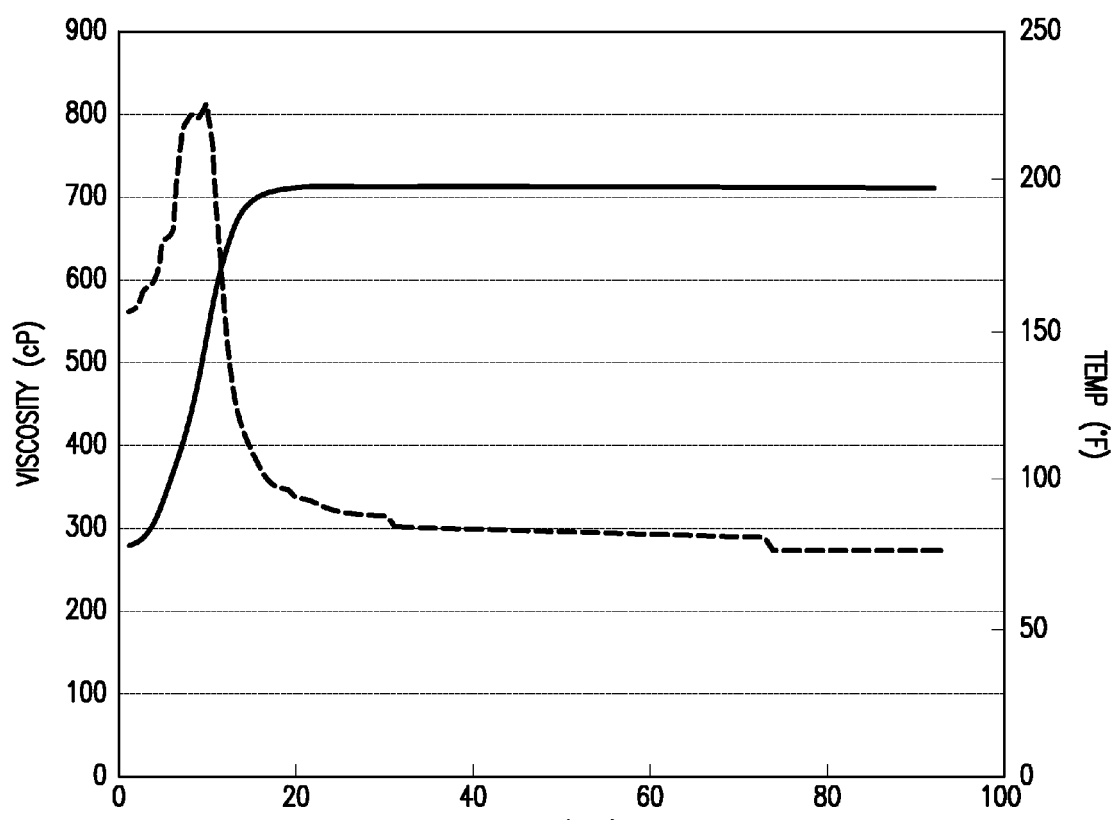
FIG. 1 is a rheology profile for a frac fluid of combined VES and crosslinked CMHPG in synthetic water Sample 1 at a shear rate of 81 sec$^{-1}$ and 200° F. (93° C.).

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed. As used herein, the words "consisting essentially of," and all grammatical variations thereof are intended to limit the scope of a claim to the specified materials or steps and those that do not materially affect the basic and novel characteristic(s) of the claimed invention.

The indefinite articles "a" or "an" mean one or more than one of the component, part, or step that the article introduces.

Each numerical value should be read once as modified by the term "about" (unless already expressly so modified), and then read again as not so modified, unless otherwise indicated in context.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

It should be understood that algebraic variables and other scientific symbols used herein are selected arbitrarily or according to convention. Other algebraic variables can be used.

The control or controlling of a condition includes any one or more of maintaining, applying, or varying of the condition. For example, controlling the temperature of a substance can include heating, cooling, or thermally insulating the substance.

Oil and Gas Reservoirs

In the context of production from a well, "oil" and "gas" are understood to refer to crude oil and natural gas, respectively. Oil and gas are naturally occurring hydrocarbons in certain subterranean formations.

A "subterranean formation" is a body of rock that has sufficiently distinctive characteristics and is sufficiently continuous for geologists to describe, map, and name it.

A subterranean formation having a sufficient porosity and permeability to store and transmit fluids is sometimes referred to as a "reservoir."

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

Wells

A "well" includes a wellhead and at least one wellbore from the wellhead penetrating the earth. The "wellhead" is the surface termination of a wellbore, which surface may be on land or on a seabed.

A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well or any other tubulars in the well. The "borehole" usually refers to the inside wellbore wall, that is, the rock surface or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

A wellbore can be used as a production or injection wellbore. A production wellbore is used to produce hydrocarbons from the reservoir. An injection wellbore is used to inject a fluid, for example, liquid water or steam, to drive oil or gas to a production wellbore.

As used herein, introducing "into a well" means introducing at least into and through the wellhead. According to various techniques known in the art, tubulars, equipment, tools, or fluids can be directed from the wellhead into any desired portion of the wellbore.

As used herein, the word "treatment" refers to any treatment for changing a condition of a portion of a wellbore or a subterranean formation adjacent a wellbore; however, the word "treatment" does not necessarily imply any particular treatment purpose. A treatment usually involves introducing a fluid for the treatment, in which case it may be referred to as a treatment fluid, into a well. As used herein, a "treatment fluid" is a fluid used in a treatment. The word "treatment" in the term "treatment fluid" does not necessarily imply any particular treatment or action by the fluid.

In the context of a well or wellbore, a "portion" or "interval" refers to any downhole portion or interval along the length of a wellbore.

A "zone" refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." A "treatment zone" refers to an interval of rock along a wellbore into which a fluid is directed to flow from the wellbore. As used herein, "into a treatment zone" means into and through the wellhead and, additionally, through the wellbore and into the treatment zone.

Generally, the greater the depth of the formation, the higher the static temperature and pressure of the formation. Initially, the static pressure equals the initial pressure in the formation before production. After production begins, the static pressure approaches the average reservoir pressure.

Deviated wells are wellbores inclined at various angles to the vertical.

Complex wells include inclined wellbores in high-temperature or high-pressure downhole conditions.

A "design" refers to the estimate or measure of one or more parameters planned or expected for a particular fluid or stage of a well service or treatment. For example, a fluid can be designed to have components that provide a minimum density or viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment during the time of a treatment. For example, the design temperature for a well treatment takes into account not only the bottom hole static temperature ("BHST"), but also the effect of the temperature of the fluid on the BHST during treatment. The design temperature for a fluid is sometimes referred to as the bottom hole circulation temperature ("BHCT"). Because fluids may be considerably cooler than BHST, the difference between the two temperatures can be quite large. Ultimately, if left undisturbed a subterranean formation will return to the BHST.

Well Servicing and Fluids

To produce oil or gas from a reservoir, a wellbore is drilled into a subterranean formation, which may be the reservoir or adjacent to the reservoir. Typically, a wellbore of a well must be drilled hundreds or thousands of feet into the earth to reach a hydrocarbon-bearing formation.

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation. A well service usually involves introducing a fluid into a well.

Common Well Treatments and Treatment Fluids

Well services can include various types of treatments that are commonly performed in a wellbore or subterranean formation.

For example, a treatment for fluid-loss control can be used during any of drilling, completion, and intervention operations. During completion or intervention, stimulation is a type of treatment performed to enhance or restore the productivity of oil and gas from a well.

Well services can include various types of treatments that are commonly performed in a wellbore or subterranean formation. For example, stimulation is a type of treatment performed to enhance or restore the productivity of oil or gas from a well. Even small improvements in fluid flow can yield dramatic production results.

Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Fracturing treatments are often applied in treatment zones having poor natural permeability. Matrix treatments are often applied in treatment zones having good natural permeability to counteract damage in the near-wellbore area.

Hydraulic Fracturing

Hydraulic fracturing is a common stimulation treatment. The purpose of a hydraulic fracturing treatment is to provide an improved flow path for oil or gas to flow from the hydrocarbon-bearing formation to the wellbore. In addition, a fracturing treatment can facilitate the flow of injected treatment fluids from the well into the formation. A treatment fluid adapted for this purpose is sometimes referred to as a fracturing fluid. The fracturing fluid is pumped at a sufficiently high flow rate and pressure into the wellbore and into the subterranean formation to create or enhance one or more fractures in the subterranean formation. Creating a fracture means making a new fracture in the formation. Enhancing a fracture means enlarging a pre-existing fracture in the formation.

A newly-created or newly-extended fracture will tend to close together after the pumping of the fracturing fluid is stopped. To prevent the fracture from closing, a material is usually placed in the fracture to keep the fracture propped open and to provide higher fluid conductivity than the matrix of the formation. A material used for this purpose is referred to as a proppant.

A proppant is in the form of a solid particulate, which can be suspended in the fracturing fluid, carried downhole, and deposited in the fracture to form a proppant pack. The proppant pack props the fracture in an open condition while allowing fluid flow through the permeability of the pack. The proppant pack in the fracture provides a higher-permeability flow path for the oil or gas to reach the wellbore compared to the permeability of the matrix of the surrounding subterranean formation. This higher-permeability flow path increases oil and gas production from the subterranean formation.

A particulate for use as a proppant is usually selected based on the characteristics of size range, crush strength, and solid stability in the types of fluids that are encountered or used in wells. Preferably, a proppant should not melt, dissolve, or otherwise degrade from the solid state under the downhole conditions.

The proppant is selected to be an appropriate size to prop open the fracture and bridge the fracture width expected to be created by the fracturing conditions and the fracturing fluid. If the proppant is too large, it will not easily pass into a fracture and will screenout too early. If the proppant is too small, it will not provide the fluid conductivity to enhance production. See, for example, W. J. McGuire and V. J. Sikora, "The Effect of Vertical Fractures on Well Productivity," *Trans.*, AIME (1960) 219, 401-403. In the case of fracturing relatively permeable or even tight-gas reservoirs, a proppant pack should provide higher permeability than the matrix of the formation. In the case of fracturing ultra-low permeable formations, such as shale formations, a proppant pack should provide for higher permeability than the naturally occurring fractures or other micro-fractures of the fracture complexity.

Appropriate sizes of particulate for use as a proppant are typically in the range from about 8 to about 100 U.S. Standard Mesh. A typical proppant is sand-sized, which geologically is defined as having a largest dimension ranging from about 0.06 millimeters up to about 2 millimeters (mm). (The next smaller particle size class below sand size is silt, which is defined as having a largest dimension ranging from less than about 0.06 mm down to about 0.004 mm.) As used herein, proppant does not mean or refer to suspended solids, silt, fines, or other types of insoluble solid particulate smaller than about 0.06 mm (about 230 U.S. Standard Mesh). Further, it does not mean or refer to particulates larger than about 3 mm (about 7 U.S. Standard Mesh).

The proppant is sufficiently strong, that is, has a sufficient compressive or crush resistance, to prop the fracture open without being deformed or crushed by the closure stress of the fracture in the subterranean formation. For example, for a proppant material that crushes under closure stress, a 20/40 mesh proppant preferably has an API crush strength of at least 4,000 psi closure stress based on 10% crush fines according to procedure API RP-56. A 12/20 mesh proppant material preferably has an API crush strength of at least 4,000 psi closure stress based on 16% crush fines according to procedure API RP-56. This performance is that of a medium crush-strength proppant, whereas a very high crush-strength proppant would have a crush-strength of about 10,000 psi. In comparison, for example, a 100-mesh proppant material for use in an ultra-low permeable formation such as shale preferably has an API crush strength of at least 5,000 psi closure stress based on 6% crush fines. The higher the closing pressure of the formation of the fracturing application, the higher the strength of proppant is needed. The closure stress depends on a number of factors known in the art, including the depth of the formation.

Further, a suitable proppant should be stable over time and not dissolve in fluids commonly encountered in a well environment. Preferably, a proppant material is selected that will not dissolve in water or crude oil.

Suitable proppant materials include, but are not limited to, silica sand, ground nut shells, ground fruit pits, sintered bauxite, glass, plastics, ceramic materials, processed wood, composite materials, resin coated particulates, and any combination of the foregoing. Mixtures of different kinds or sizes of proppant can be used as well.

In conventional reservoirs, a proppant commonly has a median size anywhere within the range of about 20 to about 100 U.S. Standard Mesh. For a synthetic proppant, it commonly has a median size anywhere within the range of about 8 to about 100 U.S. Standard Mesh.

The concentration of proppant in the treatment fluid depends on the nature of the subterranean formation. As the nature of subterranean formations differs widely, the concentration of proppant in the treatment fluid may be in the range of from about 0.03 kilograms to about 12 kilograms of proppant per liter of liquid phase (from about 0.1 lb/gal to about 25 lb/gal).

A resinous material can be coated on the proppant. Purposes of the coating can include improving the strength of a proppant, changing a wettability characteristic of the proppant for improving flow of oil or gas, or reducing the migration of a particulate in the formation that is smaller than the proppant, which can plug pores in the formation or proppant pack, decrease production, or cause abrasive damage to wellbore pumps, tubing, and other equipment.

Phases and Physical States

As used herein, "phase" is used to refer to a substance having a chemical composition and physical state that is distinguishable from an adjacent phase of a substance having a different chemical composition or a different physical state.

As used herein, if not otherwise specifically stated, the physical state or phase of a substance (or mixture of substances) and other physical properties are determined at a temperature of 77° F. (25° C.) and a pressure of 1 atmosphere (Standard Laboratory Conditions) without applied shear.

Hydratability or Solubility

As referred to herein, "hydratable" means capable of being hydrated by contacting the hydratable material with water. Regarding a hydratable material that includes a polymer, this means, among other things, to associate sites on the polymer with water molecules and to unravel and extend the polymer chain in the water.

The term "solution" is intended to include not only true molecular solutions but also dispersions of a polymer wherein the polymer is so highly hydrated as to cause the dispersion to be visually clear and having essentially no particulate matter visible to the unaided eye. The term "soluble" is intended to have a meaning consistent with these meanings of solution.

A substance is considered to be "soluble" in a liquid if at least 10 grams of the substance can be hydrated or dissolved in one liter of the liquid when tested at 77° F. and 1 atmosphere pressure for 2 hours, considered to be "insoluble" if less than 1 gram per liter, and considered to be "sparingly soluble" for intermediate solubility values.

As will be appreciated by a person of skill in the art, the hydratability, dispersibility, or solubility of a substance in water can be dependent on the salinity, pH, or other substances in the water. Accordingly, the salinity, pH, and additive selection of the water can be modified to facilitate the hydratability, dispersibility, or solubility of a substance in aqueous solution. To the extent not specified, the hydratability, dispersibility, or solubility of a substance in water is determined in deionized water, at neutral pH, and without any other additives.

As used herein, "salt tolerance" of a polymeric material means it hydrates well in the presence of dissolved salts to provide viscosity, for example, in 2% KCl or in presence of divalent ions, for example, in synthetic seawater.

Fluids

A fluid can be a homogeneous or heterogeneous. In general, a fluid is an amorphous substance that is or has a continuous phase of particles that are smaller than about 1 micrometer that tends to flow and to conform to the outline of its container.

Every fluid inherently has at least a continuous phase. A fluid can have more than one phase. The continuous phase of a treatment fluid is a liquid under Standard Laboratory Conditions. For example, a fluid can be in the form of a suspension (larger solid particles dispersed in a liquid phase), a sol (smaller solid particles dispersed in a liquid phase), an emulsion (liquid particles dispersed in another liquid phase), or a foam (a gas phase dispersed in a liquid phase).

As used herein, a "water-based" fluid means that water or an aqueous solution is the dominant material of the continuous phase, that is, greater than 50% by weight, of the continuous phase of the fluid based on the combined weight of water and any other solvents in the phase (that is, excluding the weight of any dissolved solids).

Apparent Viscosity of a Fluid

Viscosity is a measure of the resistance of a fluid to flow. In everyday terms, viscosity is "thickness" or "internal friction." Therefore, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear rate.

Most fluids are non-Newtonian fluids. Accordingly, the apparent viscosity of a fluid applies only under a particular set of conditions including shear stress versus shear rate, which must be specified or understood from the context. As used herein, a reference to viscosity is actually a reference to an apparent viscosity. Apparent viscosity is commonly expressed in units of mPa·s or centipoise (cP), which are equivalent.

Gels and Deformation

Technically, a "gel" is a semi-solid, jelly-like physical state or phase that can have properties ranging from soft and weak to hard and tough. Shearing stresses below a certain finite value fail to produce permanent deformation. The minimum shear stress which will produce permanent deformation is referred to as the shear strength or gel strength of the gel.

The physical state of a gel is formed by a network of interconnected molecules, such as a crosslinked polymer or a network of micelles in a continuous liquid phase. The network gives a gel phase its structure and an apparent yield point. At the molecular level, a gel is a dispersion in which both the network of molecules is continuous and the liquid is continuous. A gel is sometimes considered as a single phase.

A hydrogel is a gel state having a network of polymer chains that are hydrophilic and for which water is the dispersion medium. In some cases, a "hydrogel" refers to a natural or synthetic polymeric material that is a highly absorbent and that can form such a gel.

In the oil and gas industry, however, the term "gel" may be used to refer to any fluid having a viscosity-increasing agent, regardless of whether it is a viscous fluid or meets the technical definition for the physical state of a gel. A "base gel" is a term used in the field for a fluid that includes a viscosity-increasing agent, such as guar or other polymer, but that excludes crosslinking agents. Typically, a base gel is mixed with another fluid containing a crosslinker, wherein the mixture is adapted to form a crosslinked gel. Similarly, a "crosslinked gel" may refer to a substance having a viscosity-increasing agent that is crosslinked, regardless of whether it is a viscous fluid or meets the technical definition for the physical state of a gel.

As used herein, a substance referred to as a "gel" is subsumed by the concept of "fluid" if it is a pumpable fluid.

General Measurement Terms

Unless otherwise specified or unless the context otherwise clearly requires, any ratio or percentage means by weight.

Unless otherwise specified or unless the context otherwise clearly requires, the phrase "by weight of the water" means the weight of the water of an aqueous phase of the fluid without the weight of any viscosity-increasing agent, dissolved salt, suspended particulate, or other materials or additives that may be present in the water.

If there is any difference between U.S. or Imperial units, U.S. units are intended. For example, "GPT" or "gal/Mgal" means U.S. gallons per thousand U.S. gallons and "ppt" means pounds per thousand U.S. gallons.

Unless otherwise specified, mesh sizes are in U.S. Standard Mesh.

The conversion between pound per gallon (lb/gal or ppg) and kilogram per cubic meter ($kg/m^3$) is: 1 $lb/gal=(0.4536$ $kg/lb)\times(gal/0.003785$ $m^3)=120$ $kg/m^3$.

General Fluid Composition According to Disclosure

In an embodiment, a fluid is provided comprising: (i) a continuous aqueous phase, wherein the continuous aqueous phase has total dissolved solids in a concentration of at least 30,000 mg/l; (ii) an alkyl amido quaternary amine; (iii) a polymer, wherein the polymer is water-soluble or water-hydratable; and (iv) a crosslinker for the polymer.

Figure 3:
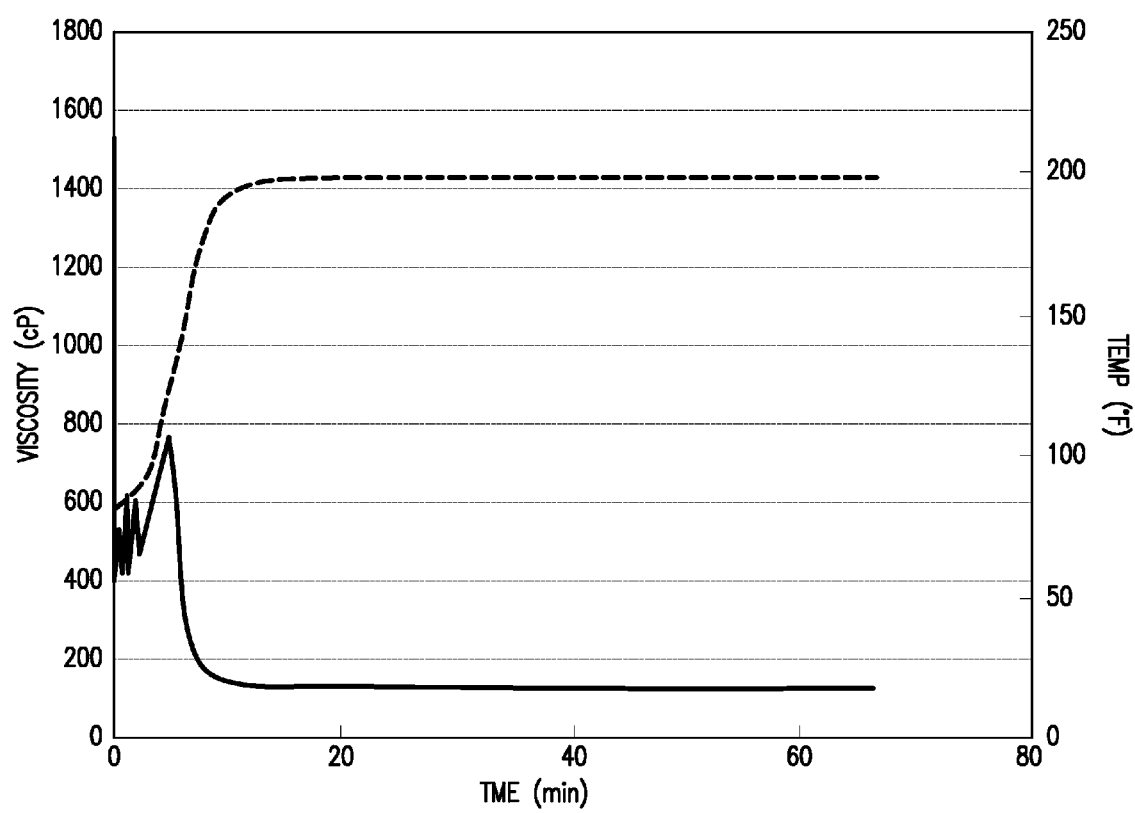
FIG. 3 is a rheology profile for a frac fluid of the VES without crosslinked CMHPG in synthetic water Sample 1 at 81 sec$^{-1}$ and 200° F. (93° C.).
Figure 4:
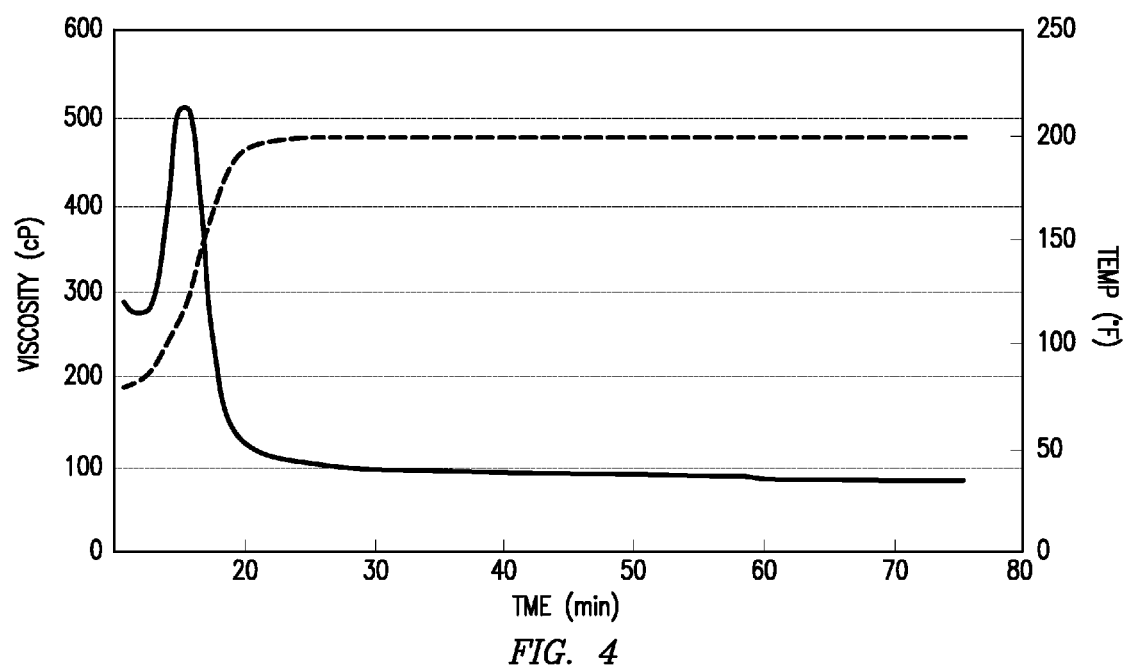
FIG. 4 is a rheology profile for a frac fluid of the crosslinked CMHPG without the VES in synthetic water Sample 1 at 81 sec$^{-1}$ and 200° F. (93° C.).

There is a synergism in the fluid between this type of viscoelastic surfactant and a crosslinked polymer. Without being limited by any theory, it is believed the synergism exists due to positive interaction between oppositely charged molecules, that is, between the anionic polymer and cationic VES molecules. Viscoelastic surfactants can self-assemble into long wormlike micelles in the presence of salt, and the entanglement of these micelles make a network like structure which imparts viscoelastic properties to the fluid. These micellar networks can function as thickening agents in aqueous system. The extent of micellar self-assembly is dependent of many factors such as the chain length of the surfactant molecule, the flexibility, the temperature of the fluid, the nature of counter ions present and the salt concentration. It has been observed in the prior art when an organic counter ion is present such as any moiety having a COOH group such as salicylate or citrate kind of anionic groups can get inserted and associated with positively charged head groups of the surfactant hence they promote micellar growth and enhance the viscosity of the fluid. In experiments with CMHPG and the viscoelastic surfactant (VES), since CMHPG contains COOH groups which may act as counter anions, these are believed to help in micellar growth and lead to enhanced viscosity, as supported by the experimental results as well. In FIG. 3 and FIG. 4 respectively when only VES component and only CMHPG is used the viscosity is not retained and the rheology curve declines within 14 minutes while in FIG. 1 and FIG. 2 when CMHPG is used in combination with the VES, the Viscosity is retained above 250 cP for more than 90 minutes.

Usually the fracturing fluids are expected to work in a pH range about 9 to about 11. Since this produced water are having high salt concentrations, so the pH is lower than the fresh water and generally within the range about 5.5 to about 6.9. As the crosslinkers such as titanium-based or zirconium-based crosslinkers work efficiently in the higher pH range such as about 9.5 to about 11, it is a general practice to elevate the pH of the water for the frac fluid around 9.5 to 10 by adding an buffer such as sodium hydroxide. But in trying to reuse the produced water, since it contains a very high concentration of dissolved salts, the moment the sodium hydroxide is added, the dissolved salts start precipitating out in the fluid and small fisheyes are obtained, which disturb the homogeneity of the fluid. Accordingly, fisheyes are undesirable. The disclosed type of viscoelastic surfactant is capable of providing high viscosities even at lower pH such as about 8.5 so this eliminates the precipitation issues caused when needed to increase the pH, for example, by adding sodium hydroxide.

A fracturing fluid according to the disclosure can work in high TDS produced water without compromising performance. Produced water can be used "as it is" or with minimal purification treatment before use of the water in a fracturing fluid, so this eliminates at least some water pre-treatment and the costs associated with such purification. Minimal purification of a high-TDS water source means using a simple technique such as filtration to remove any particulate impurities present in order to use the water, such as a flowback or produced water. Minimal purification would avoid purifications steps to remove or precipitate the dissolved salts present in the water source.

A fluid According to the disclosure can be rheologically stable at temperatures of up to about 300 F (150° C.) and can form viscoelastic gels in low or high density brines with a strong elasticity that is suitable for carrying a solid particulate into a subterranean operation.

Such a composition is advantageously injected into, for example, an underground system for use in drilling, stimulation (such as hydraulic fracturing), for permeability modification of underground formations, and for uses such as gravel packing, and cementing.

According to another embodiment of the disclosure, a method of treating a well, is provided, the method including the steps of: forming a treatment fluid according to the disclosure; and introducing the treatment fluid into the well.

Continuous Aqueous Phase

A treatment fluid for use in a well is selected for having a continuous aqueous phase. As large volumes of treatment fluid can be required, for example, hundreds of thousands of gallons, it is highly desirable to be able to use cheap and readily-available water sources for making up the continuous aqueous phase.

However, the dissolved salts can be a problem for the chemicals used in the fluid that are selected to provide desired rheological characteristics.

Total dissolved solids ("TDS") refers to the sum of all minerals, metals, cations, and anions dissolved in water. As most of the dissolved solids are typically salts, the amount of salt in water is often described by the concentration of total dissolved solids in the water.

Total dissolved solids can be determined by evaporating a pre-filtered sample to dryness, and then finding the mass of the dry residue per liter of sample. A second method uses a Vernier Conductivity Probe to determine the ability of the dissolved salts in an unfiltered sample to conduct an electrical current. The conductivity is then converted to TDS. Either of these methods yields a TDS value, typically reported in units of mg/l (or ppm).

Generally, produced water contains TDS in the range of about 30,000 mg/l to about 250,000 mg/l. If the TDS are in the range of about 30,000 mg/l to about 60,000 mg/l, the produced water is considered to be a "low" TDS produced water; if the TDS are greater than about 100,000 mg/l, the produced water is considered to be a "high" TDS produced water.

Another source of water that may have such concentrations of TDS is flowback water from a previous treatment in a well.

A salt-tolerant treatment fluid would allow water sources such as flowback water or produced water having such concentrations of TDS to be used in the treatment fluid without need for pre-treatment of the water to reduce the TDS and without need for dilution of such water with another lower TDS water source, such as freshwater.

For making a treatment fluid such as a fracturing fluid for use in a well, it is desirable to be able to have a continuous aqueous phase for a treatment fluid having at least 30,000 mg/l of TDS or higher concentrations while obtaining good rheological properties for the fluid. It is more desirable to be able to have a continuous aqueous phase for a treatment fluid having at least about 60,000 mg/l TDS, and it is especially desirable to be able to have a continuous aqueous phase for a treatment fluid having at least about 100,000 mg/l TDS.

Cationic Alkylamidoalkyl Quaternary Amine

It should be understood that merely increasing the viscosity of a fluid may only slow the settling or separation of distinct phases and does not necessarily stabilize the suspension of any particles in the fluid.

Certain viscosity-increasing agents can also increase the elastic modulus of the fluid. The elastic modulus is the measure of a substance's tendency to be deformed non-permanently when a force is applied to it. The elastic modulus of a fluid, commonly referred to as G', is a mathematical expression and defined as the slope of a stress versus strain curve in the elastic deformation region. G' is expressed in units of pressure, for example, Pa (Pascals) or dynes/cm$^2$. As a point of reference, the elastic modulus of water is negligible and considered to be zero.

An example of a viscosity-increasing agent that is also capable of increasing the suspending capacity of a fluid is to use a viscoelastic surfactant. As used herein, the term "viscoelastic surfactant" or "VES" refers to a surfactant that imparts or is capable of imparting viscoelastic behavior to a fluid due, at least in part, to the three-dimensional association of surfactant molecules to form viscosifying micelles. When the concentration of the viscoelastic surfactant in a viscoelastic fluid significantly exceeds a critical concentration, and in most cases in the presence of an electrolyte, surfactant molecules aggregate into species such as micelles, which can interact to form a network exhibiting elastic behavior.

As used herein, the term "micelle" is defined to include any structure that minimizes the contact between the lyophobic ("solvent-repelling") portion of a surfactant molecule and the solvent, for example, by aggregating the surfactant molecules into structures such as spheres, cylinders, or sheets, wherein the lyophobic portions are on the interior of the aggregate structure and the lyophilic ("solvent-attracting") portions are on the exterior of the structure.

According to this disclosure, the viscoelastic surfactant is or includes at least one cationic alkylamidoalkyl quaternary amine. Preferably, the cationic alkylamidoalkyl quaternary amine is not zwitterionic or amphoteric.

In various embodiments, the cationic alkylamidoalkyl quaternary amine is of the general formula:

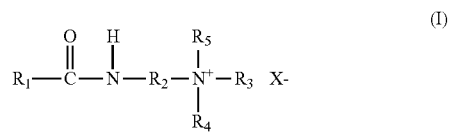

(I)

wherein:

$R_1$ is a straight or branched, saturated or unsaturated, substituted or unsubstituted, non-aromatic alkyl group having 10 to 30 carbon atoms;

$R_2$ is straight or branched, saturated or unsaturated, substituted or unsubstituted, non-aromatic alkyl group having 2 to 6 carbon atoms;

$R_3$, $R_4$, and $R_5$ are independently selected from straight or branched, saturated or unsaturated, substituted or unsubstituted, non-aromatic alkyl groups having 1 to 6 carbon atoms and wherein any two of $R_3$, $R_4$, or $R_5$ together with the nitrogen atom to which these groups are bonded can be a heterocyclic ring of up to 6 members; and $X^-$ is a counter ion (an anion) to the quaternary amine (a cation).

In various embodiments, $R_1$ is hydrophobic. In various embodiments, $R_1$ is branched, which is believed to provide better viscosity at higher temperatures (that is, temperatures greater than about 250° F. (121° C.)). In various embodiments, $R_1$ is saturated. In various embodiments, $R_1$ is unsubstituted with any group including a heteroatom. $R_1$ can be restricted to a single chain length or can be of mixed chain length such as those groups derived from natural fats, oils, or petroleum stocks. For example, $R_1$ can be derived from natural fats or oils. Examples of fats or oils from which $R_1$ can be derived include tallow alkyl, rapeseed alkyl, erucic alkyl, tall oil alkyl, coco alkyl, oleyl, or soya alkyl.

In various embodiments, $R_2$ is straight. In various embodiments, $R_2$ is saturated. In various embodiments, $R_2$ is unsubstituted with any group including a heteroatom. In various embodiments, $R_2$ is a straight, saturated, and unsubstituted alkyl group having 2 to 6 carbon atoms, preferably, having 2 to 4 carbon atoms, and more preferably having 3 carbon atoms (that is, propyl).

In various embodiments, $R_3$, $R_4$, and $R_5$ are independently selected from straight alkyl groups. In various embodiments, $R_3$, $R_4$, and $R_5$ are independently selected from saturated alkyl groups. In various embodiments, $R_3$, $R_4$, and $R_5$ are independently selected from alkyl groups having 1 to 3 carbon atoms, and, in various embodiments, these are preferably independently selected from the group consisting of methyl, ethyl, and propyl.

In various embodiments, $X^-$ is an acceptable counter ion, including, but not limited to halides, oxo ions of phosphorous, sulfur, or chloride, organic anions including but not limited to chlorides, bromides, iodides, oxides of phosphorous, hypochlorides, phosphates, oxides of sulfur, sulfates, sulfites, sulfonates, acetates, carboxylates, chlorates, perchlorates, salicylates, phthalates, lactates, maleates, glycinates, citrates, citric acid, lactic acid, salicylic acid, phthalic acid, benzoic acid, naphthoic acid, amino acids, and the like. In various embodiments, the counter ion is a non-aromatic alkyl sulfate having from 1 to 5 carbon atoms.

In various embodiments, X⁻ is selected from the group consisting of: a linear alkyl sulfate, a linear alkyl sulfonate, a linear alpha olefin sulfate, a linear alpha olefin sulfonate, a linear fatty acid sulfonate, a linear sulfur succinate or a mixture thereof.

In various embodiments, the VES is Isostearamidopropyl Ethyldimonium Ethosulfate (CAS 67633-63-0). The structure of this chemical compound can be represented as:

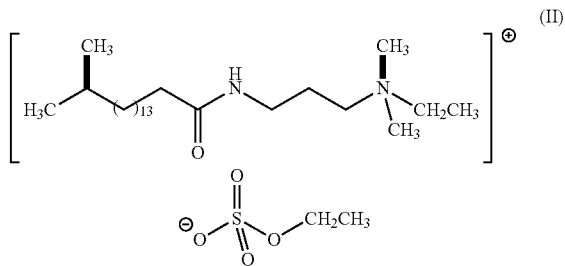

This VES surfactant is commercially available from Lubrizol Advanced Materials, Inc., Ohio, as SCHERCOQUAT™ "IAS-PG Specialty Quat." SCHERCOQUAT™ IAS-PG Specialty Quat is mixture of Isostearamidopropyl Ethyldimonium Ethosulfate (80-90% w/w) and propylene glycol (8-20%, w/w). Another compound Isostearamidopropyl dimethyl amine (CAS 67799-04-6) is also present in a small concentration (0.5-1.5%). The % in the composition of SCHERCOQUAT™ IAS-PG is w/w of the commercial product, that is, 80 gram of Isostearamidopropyl Ethyldimonium Ethosulfate in 100 gram of SCHERCOQUAT™ IAS-PG. Propylene glycol is a solvent present in the commercial mixture.

In various embodiments, the VES is or includes erucyl amidopropyl trimethyl ammonium chloride.

The concentration of the VES in the aqueous treatment fluid is generally in the range of from about 0.5% to about 20% by weight, preferably from about 2% to about 12% by weight, and more preferably from about 3% to about 8% by weight based on the total weight of the composition.

Optional Co-Additive for VES

In various embodiments, the composition can include one or more co-additives for the VES. The co-additive functions to enhance the viscosity of the viscoelastic fluid of an alkyl amido quaternary amine, especially at elevated temperatures. It can also reduce the preparation stage of such a viscosified fluid in the field.

The co-additive can be in addition to the counter ion for the VES. Preferred co-additives include, but are not limited to sulfonates, sulfates, inorganic or organic acids, and the like. Particularly effective co-additives include a linear alkyl sulfate, a linear alkyl sulfonate, a linear alpha olefin sulfate, a linear alpha olefin sulfonate, a linear fatty acid sulfonate, and a linear sulfur succinate with a carbon chain length of C6 to C24, preferably C10 to C14.

An example of a treatment fluid according to the disclosure includes a VES of Isostearamidopropyl Ethyldimonium Ethosulfate, erucyl amidopropyl trimethyl ammonium chloride, and any combination thereof, and a co-additive of an alkyl sulfate, for example, sodium lauryl sulfate.

The ratio of the one or more alkyl amido quaternary amines to one or more of the co-additive(s) in the composition, on a weight basis, varies from about 1,000 to 1; in another embodiment about 100 to 2; and in still another embodiment about 20 to 5. Generally, the range is from about 10:1 to about 3:1, in another embodiment 6:1 to about 4:1.

The concentration of co-additive in the aqueous viscoelastic composition is generally in the range of from about 0.001% to about 10% by weight, preferably from about 0.01% to about 1% by weight, and more preferably from about 0.1% to about 0.5% by weight based on the total weight of the composition.

Polymer as Viscosity-Increasing Agent

A fluid can be adapted to be a carrier fluid for a particulate.

For example, a proppant used in fracturing or a gravel used in gravel packing may have a much different density than the carrier fluid. For example, sand has a specific gravity of about 2.7, whereas water has a specific gravity of 1.0 at Standard Laboratory Conditions of temperature and pressure. A proppant or gravel having a different density than water will tend to separate from water very rapidly.

Increasing the viscosity of a fluid can help prevent a particulate having a different specific gravity than a surrounding phase of the fluid from quickly separating out of the fluid.

A viscosity-increasing agent can be used to increase the ability of a fluid to suspend and carry a particulate material in a fluid. In other contexts, a viscosity-increasing agent can be used for other purposes, such as matrix diversion, conformance control, or friction reduction.

A viscosity-increasing agent is sometimes referred to in the art as a viscosifying agent, viscosifier, thickener, gelling agent, or suspending agent. In general, any of these refers to an agent that includes at least the characteristic of increasing the viscosity of a fluid in which it is dispersed or dissolved, however, if polymeric, it should be considered to be other than a viscoelastic surfactant.

In general, because of the high volume of fracturing fluid typically used in a fracturing operation, it is desirable to efficiently increase the viscosity of fracturing fluids to the desired viscosity using as little viscosity-increasing agent as possible. In addition, relatively inexpensive materials are preferred. Being able to use only a small concentration of the viscosity-increasing agent requires a lesser concentration of the viscosity-increasing agent in order to achieve the desired fluid viscosity.

Certain kinds of polymers can be used to increase the viscosity of a fluid. In general, the purpose of using a polymer is to increase the ability of the fluid to suspend and carry a particulate material. Polymers for increasing the viscosity of a fluid are preferably soluble in the external phase of a fluid. Polymers for increasing the viscosity of a fluid can be naturally occurring polymers such as polysaccharides, derivatives of naturally occurring polymers, or synthetic polymers.

Treatment fluids used in high volumes, such as fracturing fluids, are usually water-based. Efficient and inexpensive viscosity-increasing agents for water include certain classes of water-soluble polymers.

The water-soluble polymer can have an average molecular weight in the range of from about 50,000 to 20,000,000, most preferably from about 100,000 to about 4,000,000. For example, guar polymer is believed to have a molecular weight in the range of about 2 to about 4 million.

Typical water-soluble polymers used in well treatments include water-soluble polysaccharides and water-soluble synthetic polymers (for example, polyacrylamide). The most common water-soluble polysaccharides employed in well treatments are guar and its derivatives.

A polymer can be classified as being single chain or multi chain, based on its solution structure in aqueous liquid media. Examples of single-chain polysaccharides that are commonly used in the oilfield industry include guar, guar derivatives, and cellulose derivatives. Guar polymer, which is derived from the beans of a guar plant, is referred to chemically as a galactomannan gum. Examples of multi-chain polysaccharides include xanthan, diutan, and scleroglucan, and derivatives of any of these. Without being limited by any theory, it is currently believed that the multi-chain polysaccharides have a solution structure similar to a helix or are otherwise intertwined.

A guar derivative can be selected from the group consisting of, for example, a carboxyalkyl derivative of guar, a hydroxyalkyl derivative of guar, and any combination thereof. Preferably, the guar derivative is selected from the group consisting of carboxymethylguar, carboxymethylhydroxyethylguar, carboxymethylhydroxypropylguar ("CM-HPG"), ethylcarboxymethylguar, hydroxyethylguar, hydroxypropylmethylguar, and hydroxypropylguar ("HPG").

A cellulose derivative can be selected from the group consisting of, for example, a carboxyalkyl derivative of cellulose, a hydroxyalkyl derivative of cellulose, and any combination thereof. Preferably, the cellulose derivative is selected from the group consisting of carboxymethylcellulose, carboxymethylhydroxyethylcellulose, hydroxyethylcellulose, methylcellulose, ethylcellulose, ethylcarboxymethylcellulose, and hydroxypropylmethylcellulose.

As used herein, unless the context otherwise requires, a "polymer" or "polymeric material" includes homopolymers, copolymers, terpolymers, etc. In addition, the term "copolymer" as used herein is not limited to the combination of polymers having two monomeric units, but includes any combination of monomeric units, for example, terpolymers, tetrapolymers, etc.

As used herein, "modified" or "derivative" means a chemical compound formed by a chemical process from a parent compound, wherein the chemical backbone skeleton of the parent compound is retained in the derivative. The chemical process preferably includes at most a few chemical reaction steps, and more preferably only one or two chemical reaction steps. As used herein, a "chemical reaction step" is a chemical reaction between two chemical reactant species to produce at least one chemically different species from the reactants (regardless of the number of transient chemical species that may be formed during the reaction). An example of a chemical step is a substitution reaction. Substitution on the reactive sites of a polymeric material may be partial or complete.

In various embodiments, the polymer is selected from the group consisting of natural and synthetic polymers. For example, the polymer can be selected from the group consisting of guar derivatives and cellulose derivatives, wherein the derivative has anionic groups selected for crosslinking of the polymer.

In various embodiments, the polymer is selected from the group consisting of: hydroxyl propyl guar ("HPG"), hydroxy ethyl cellulose ("HEC"), carboxymethyl hydroxyl propyl cellulose ("CMHEC"), carboxymethyl hydroxypropyl guar ("CMHPG"), and carboxy methyl cellulose ("CMC"), and any combination thereof.

In various embodiments, a viscosity-increasing agent can be present in the fluids in a concentration in the range of from about 0.01% to about 5% by weight of the water of the continuous phase therein.

Crosslinker for Polymer

The viscosity of a fluid at a given concentration of viscosity-increasing agent can be greatly increased by crosslinking the viscosity-increasing agent. A crosslinking agent, sometimes referred to as a crosslinker, can be used for this purpose. A crosslinker interacts with at least two polymer molecules to form a "crosslink" between them.

If crosslinked to a sufficient extent, the polysaccharide may form a gel with water. Gel formation is based on a number of factors including the particular polymer and concentration thereof, the particular crosslinker and concentration thereof, the degree of crosslinking, temperature, and a variety of other factors known to those of ordinary skill in the art.

For example, one of the most common viscosity-increasing agents used in the oil and gas industry is guar. A mixture of guar dissolved in water forms a base gel, and a suitable crosslinking agent can be added to form a much more viscous fluid, which is then called a crosslinked fluid. The viscosity of base gels of guar is typically about 20 to about 50 mPa·s (cP). When a base gel is crosslinked, the viscosity is increased by 2 to 100 times depending on the temperature and the type of crosslinker used.

The degree of crosslinking depends on the type of viscosity-increasing polymer used, the type of crosslinker, concentrations, temperature of the fluid, etc. Shear is usually required to mix the base gel and the crosslinking agent. Therefore, the actual number of crosslinks that are possible and that actually form also depends on the shear level of the system. The exact number of crosslink sites is not well known, but it could be as few as one to about ten per polymer molecule. The number of crosslinks is believed to significantly alter fluid viscosity.

For a polymeric viscosity-increasing agent, any crosslinking agent that is suitable for crosslinking the chosen monomers or polymers may be used.

Cross-linking agents typically comprise at least one metal ion that is capable of cross-linking the viscosity-increasing agent molecules.

Some crosslinking agents form substantially permanent crosslinks with viscosity-increasing polymer molecules. Such crosslinking agents include, for example, crosslinking agents of at least one metal ion that is capable of crosslinking gelling agent polymer molecules. Examples of such crosslinking agents include, but are not limited to, zirconium compounds (such as, for example, zirconium lactate, zirconium lactate triethanolamine, zirconium carbonate, zirconium acetylacetonate, zirconium maleate, zirconium citrate, zirconium oxychloride, and zirconium diisopropylamine lactate); titanium compounds (such as, for example, titanium lactate, titanium maleate, titanium citrate, titanium ammonium lactate, titanium triethanolamine, and titanium acetylacetonate); aluminum compounds (such as, for example, aluminum acetate, aluminum lactate, or aluminum citrate); antimony compounds; chromium compounds; iron compounds (such as, for example, iron chloride); copper compounds; zinc compounds; sodium aluminate; or a combination thereof.

Preferably, the source of a polyvalent metal cation is derived from a water-soluble salt of the polyvalent metal in which the metal is in the same cationic valence state as the crosslinking species. By this, it is intended to mean that the metal ion which forms the crosslinking need not be freshly formed as by a change in the valence state of the metal ion In various embodiments, the crosslinker is a transition metal compound having an organic ligand. For example, the transition metal can be selected from the group consisting of titanium, zirconium, and any combination thereof.

Examples of crosslinkers include, without limitation, titanium-based crosslinkers such as organic titanate, and zirconium-based crosslinkers such as zirconium ammonium lactate and zirconium acetonyl acetate.

Where present, the cross-linking agent generally should be included in the fluids in an amount sufficient, among other things, to provide the desired degree of cross linking. In some embodiments, the cross-linking agent may be present in the treatment fluids in an amount in the range of from about 0.01% to about 5% by weight of the treatment fluid.

pH of Continuous Aqueous Phase

The broadest pH range can be from about pH 4 to about pH 12, preferred about pH 5 to about pH 11, and most preferred about pH 8.5 to about pH 10.

The pH of the aqueous phase can be adjusted with pH modifiers or buffers as will be appreciated by a person in the field. For example, sodium hydroxide can raise the pH of the aqueous phase above 8.5.

Optional Co-Solvent

In various embodiments, the treatment fluid can optionally include a water-miscible co-solvent. For example, the co-solvent can be selected from the group consisting of an alcohol, a glycol, and any combination thereof. The glycol can be selected from the group consisting of propylene glycol, ethylene glycol. In an embodiment, the co-solvent is or includes propylene glycol.

The propylene glycol may be with the surfactant as a solvent present in the commercial mixture. It is used as a solvent in the reactions to synthesize the surfactant compounds. It is also useful to maintain this formulation flowable for handling purpose. It can neither act as a surfactant nor as a co-surfactant. It is uncharged species and hence cannot interfere in the formation of aggregation of surfactant molecules, which is basis of building viscosity in a fluid. Propylene glycol is not essential, but it may affect the solvent properties of water that can affect aggregation of these surfactant molecules.

Breaking Viscosity of a Fluid

After a treatment fluid is placed where desired in the well and for the desired time, the downhole fluid usually must then be removed from the wellbore or the formation.

For example, in the case of hydraulic fracturing, the fluid should be removed leaving the proppant in the fracture and without damaging the conductivity of the proppant bed. To accomplish this removal, the viscosity of the treatment fluid must be reduced to a very low viscosity, preferably near the viscosity of water, for optimal removal from the propped fracture. Similarly, when a viscosified fluid is used for gravel packing, the viscosified fluid must be removed from the gravel pack.

Reducing the viscosity of a viscosified treatment fluid is referred to as "breaking" the fluid. Chemicals used to reduce the viscosity of treatment fluids are called breakers.

Breakers for reducing viscosity must be selected to meet the needs of each situation. First, it is important to understand the general performance criteria for breaking. In reducing the viscosity of the treatment fluid to a near water-thin state, the breaker must maintain a critical balance. Premature reduction of viscosity during the pumping of a treatment fluid can jeopardize the treatment. Inadequate reduction of fluid viscosity after pumping can also reduce production if the required conductivity is not obtained. A breaker should be selected based on its performance in the temperature, pH, time, and desired viscosity profile for each specific treatment.

In fracturing, for example, the ideal viscosity versus time profile would be if a fluid maintained 100% viscosity until the fracture closed on proppant and then immediately broke to a thin fluid. Some breaking inherently occurs during the 0.5 to 4 hours required to pump most fracturing treatments. One guideline for selecting an acceptable breaker design is that at least 50% of the fluid viscosity should be maintained at the end of the pumping time. This guideline may be adjusted according to job time, desired fracture length, and required fluid viscosity at reservoir temperature.

A typical gravel pack break criteria is a minimum 4-hour break time.

No particular mechanism is necessarily implied by breaking or breaker regarding the viscosity of a fluid.

For example, for use a fluid viscosified with a polymeric material as the viscosity-increasing agent, a breaker can operate by cleaving the backbone of polymer by hydrolysis of acetyl group, cleavage of glycosidic bonds, oxidative/reductive cleavage, free radical breakage, or a combination of these processes. Accordingly, such a breaker can reduce the molecular weight of the polymer by cutting the long polymer chain. As the length of the polymer chain is cut, the viscosity of the fluid is reduced.

In another example, a breaker may reverse a crosslinking of a viscosity-increasing agent or attack the crosslinker.

For breaking a viscoelastic fluid formed with a viscoelastic surfactant as the viscosity-increasing agent, there are two principal methods of breaking: dilution of the fluid with another fluid, such as a formation fluid, and chemical breakers, such as acids.

Chemical breakers used to help clean up a filtercake or break the viscosity of a viscosified fluid are generally grouped into several classes: oxidizers, enzymes, chelating agents, and acids.

Other Fluid Additives

A fluid can contain additives that are commonly used in oil field applications, as known to those skilled in the art. These include, but are not necessarily limited to, brines, inorganic water-soluble salts, salt substitutes (such as trimethyl or tetramethyl ammonium chloride), pH control additives, surfactants, defoamers, breakers, breaker aids, oxygen scavengers, alcohols, scale inhibitors, corrosion inhibitors, hydrate inhibitors, fluid-loss control additives, oxidizers, chelating agents, water-control agents (such as relative permeability modifiers), consolidating agents, proppant flowback control agents, conductivity enhancing agents, clay stabilizers, sulfide scavengers, fibers, nanoparticles, bactericides, and combinations thereof.

Of course, additives should be selected for not interfering with the purpose of the fluid.

Method of Treating a Well with the Fluid

According to another embodiment of the disclosure, a method of treating a well, is provided, the method including the steps of: forming a treatment fluid according to the disclosure; and introducing the treatment fluid into the well.

Forming Fluid

A fluid can be prepared at the job site, prepared at a plant or facility prior to use, or certain components of the fluid can be pre-mixed prior to use and then transported to the job site. Certain components of the fluid may be provided as a "dry mix" to be combined with fluid or other components prior to or during introducing the fluid into the well.

In certain embodiments, the preparation of a fluid can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Introducing into Well or Zone

Often the step of delivering a fluid into a well is within a relatively short period after forming the fluid, for example, less within 30 minutes to one hour. More preferably, the step of delivering the fluid is immediately after the step of forming the fluid, which is "on the fly."

It should be understood that the step of delivering a fluid into a well can advantageously include the use of one or more fluid pumps.

Introducing Below or Above Fracture Pressure

In an embodiment, the step of introducing is at a rate and pressure below the fracture pressure of the treatment zone.

In an embodiment, the step of introducing comprises introducing under conditions for fracturing a treatment zone. The fluid is introduced into the treatment zone at a rate and pressure that are at least sufficient to fracture the zone.

Allowing Time for Breaking in the Well

After the step of introducing a fluid according to the disclosure, it may be desirable to allow time for the fluid to break in the well. This preferably occurs with time under the conditions in the zone of the subterranean fluid.

Flow Back Conditions

In an embodiment, the step of flowing back is within 24 hours of the step of introducing. In another embodiment, the step of flowing back is within 16 hours of the step of introducing.

Producing Hydrocarbon from Subterranean Formation

Preferably, after any such use of a fluid according to the disclosure, a step of producing hydrocarbon from the well or a particular zone is the desirable objective.

EXAMPLES

To facilitate a better understanding of the present disclosure, the following examples of certain aspects of some embodiments are given. In no way should the following examples be read to limit, or define, the entire scope of the disclosure.

A synthetic produced water Sample 1 was prepared in-house having a TDS of 146,194 mg/l with detailed water analysis by Inductively Coupled Plasma (ICP) Spectroscopy shown in Table 1.

TABLE 1

Composition of synthetic water Sample 1

| No. | Dissolved Component | Concentration mg/L |
|---|---|---|
| 1 | Bicarbonate | 1200 |
| 2 | Chloride | 89200 |
| 3 | Sulphate | 434 |
| 4 | Calcium | 18800 |
| 5 | Magnesium | 2300 |
| 6 | Barium | 260 |
| 7 | Strontium | 6300 |
| 8 | Potassium | 1500 |
| 9 | Sodium | 26200 |
| | TDS | 146194 |
| | pH | 6.5 |

Another synthetic produced water Sample 2 was prepared in-house having a lower TDS of 111,917 mg/l. The composition of the brine is given in Table 2.

TABLE 2

Composition of synthetic water Sample 2

| No. | Dissolved Component | Concentration mg/l |
|---|---|---|
| 1 | Bicarbonate | 210 |
| 2 | Chloride | 69300 |
| 3 | Sulfate | 190 |
| 4 | Calcium | 13800 |
| 5 | Magnesium | 1900 |
| 6 | Barium | 290 |
| 7 | Strontium | 4900 |
| 8 | Iron | 67 |
| 9 | Potassium | 960 |
| 10 | Sodium | 20300 |
| | TDS | 111917 |
| | pH | 6.3 |

Example fracturing fluids were prepared and the rheology tested.

For preparing 1 L of a fracturing fluid including 40 lb/1,000 US gal (4.8 g/100 ml) CMHPG, the CMHPG was hydrated in 500 mL of a synthetic produced water in a blender for 30 min. At the end of 30 min, the pH of the gel was adjusted to be between about 8 to about 8.5 with sodium hydroxide.

In another 500 mL of the synthetic produced water, the desired concentration of VES (Schercoquat™ IAS-PG) was added under vigorous stirring in a blender. The VES fluid became viscosified in about 3 minutes.

A thermal gel stabilizer (sodium thiosulfate) can be included, which can help the polymer stability at higher temperatures. A thermal stabilizer is optional, depending on the design temperature for the application.

Finally, mixed the above two viscous fluids homogeneously with an overhead stirrer and 1.6 gpt titanium-based cross linker was added in the blend and stirred for about 2 to 3 minutes.

The crosslinked gel was loaded into a high-pressure/high-temperature (HP/HT) CHANDLER™ Model 5550 viscometer with a B5X bob and a 420 spring. The rheology vs. time and temperature was monitored at a shear rate of 81 sec-1 at 200° F. (93° C.) and 300 psi nitrogen pressure.

TABLE 3

Test Fluids

| | Fluid 1 | Fluid 2 | Fluid 3 | Fluid 4 |
|---|---|---|---|---|
| Water | Water Sample 1 | Water Sample 2 | Water Sample 1 | Water Sample 1 |
| VES | 5% VES | 5% VES | 7% VES | None |
| Polymer | 40 lb/1,000 gal CMHPG | 40 lb/1,000 gal CMHPG | None | 40 lb/1,000 gal CMHPG |
| Crosslinker | 1.6 gpt (titanium based) | 1.6 gpt (titanium based) | None | 1.6 gpt (titanium based) |
| Sodium thiosulfate as thermal gel Stabilizer | 30 lb/1,000 gal thiosulfate | 30 lb/1,000 gal thiosulfate | 30 lb/1,000 gal thiosulfate | 30 lb/1,000 gal thiosulfate |
| Temperature | 200 F. | 200 F. | 200 F. | 200 F. |
| Time | 95 min | 120 min | 120 min | 130 min |
| Initial pH | pHx = 8.5 | pHx = 8.6 | pHi = 8.03 | pHx = 8.5 |
| Final pH | pHf = 7.9 | pHf = 7.9 | pHf = 7.2 | pHf = 7.8 |
| Approximate final viscosity at shear rate 81 sec$^{-1}$ | 280 cP | 290 cP | 130 | 90 |

As used herein, "pHi," "pHx," and "pHf" are used to define the pH of a prepared treatment fluid. A "pHi" is the initial pH for a fluid that is not crosslinked. When the crosslinker is added, the fluid crosslinks within about 3 to 4 minutes and at that time the "pHx" is measured before putting the fluid in a viscometer. When the test is done and the fluid is taken out of the viscometer, that pH that is known as the final pH or "pHf".

The measured rheology profile is shown in FIG. 1. As shown in FIG. 1, the crosslinked viscosity of the fluid remains stable well above 250 cP for one and a half hours (90 min) of testing at a shear rate 81 sec-1 and temperature 200° F. (93° C.). The fluid is shear resistant at 81 sec-1 with no decrease in viscosity observed mainly due to synergistic effect of VES and CMHPG.

Figure 2:
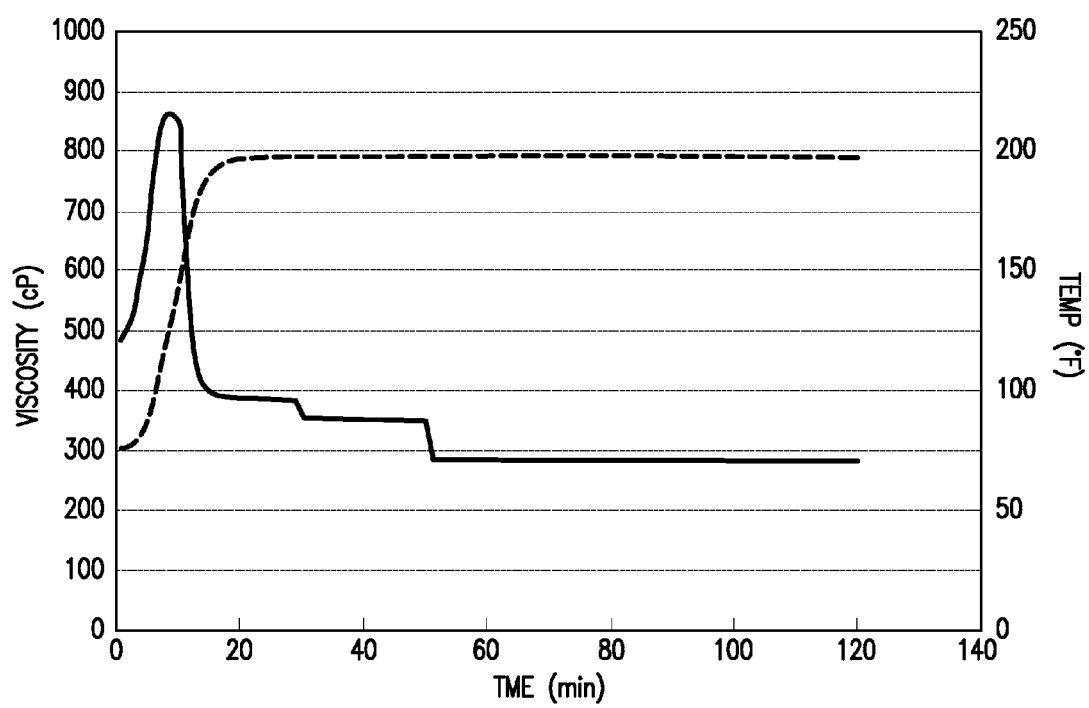
FIG. 2 is a rheology profile for a frac fluid of combined VES and crosslinked CMHPG in synthetic water Sample 2 at a shear rate of 81 sec$^{-1}$ and 200° F. (93° C.).

The rheology profile of the frac fluid prepared in the synthetic brine of Sample 2 is shown in FIG. 2. As shown in FIG. 2, the crosslinked viscosity of the fluid remains stable well above 250 cP for two hours (120 minutes) of testing at a shear rate 81 sec-1 and temperature 200° F. (93° C.). The fluid is shear resistant at 81 sec-1 with no decrease in viscosity observed mainly due to synergistic effect of VES and CMHPG.

The rheology profiles displayed in FIG. 1 and FIG. 2 show that the crosslinked viscosity of the fluid remains stable well above 250 cP at shear rate 81 sec$^{-1}$, and 200° F. (93° C.). This implicates that, at shear rate 40 sec$^{-1}$ the viscosity retained will be well above 400 cP and the fluid is adequate to be used as frac treatment fluid.

Examples were also made to test individually the water Sample 1 with only the VES or only the crosslinked CMHPG. The rheology profiles of the individual fluids are shown in FIG. 3 and FIG. 4. These figures show that the fluids using only VES or using only crosslinked CMHPG do not sustain high viscosity for longer period of time at 200° F. (93° C.) in a laboratory prepared synthetic water sample-1 having high TDS. Thus, these results confirmed that there exists a synergistic behavior when VES and crosslinked CMHPG are applied in combination, which enables the fluid to sustain the high viscosity under temperature and shear.

CONCLUSION

Therefore, the present disclosure is well adapted to attain the ends and advantages mentioned as well as those that are inherent therein.

The exemplary fluids disclosed herein may directly or indirectly affect one or more components or pieces of equipment associated with the preparation, delivery, recapture, recycling, reuse, or disposal of the disclosed fluids. For example, the disclosed fluids may directly or indirectly affect one or more mixers, related mixing equipment, mud pits, storage facilities or units, fluid separators, heat exchangers, sensors, gauges, pumps, compressors, and the like used generate, store, monitor, regulate, or recondition the exemplary fluids. The disclosed fluids may also directly or indirectly affect any transport or delivery equipment used to convey the fluids to a well site or downhole such as, for example, any transport vessels, conduits, pipelines, trucks, tubulars, or pipes used to fluidically move the fluids from one location to another, any pumps, compressors, or motors (for example, topside or downhole) used to drive the fluids into motion, any valves or related joints used to regulate the pressure or flow rate of the fluids, and any sensors (i.e., pressure and temperature), gauges, or combinations thereof, and the like. The disclosed fluids may also directly or indirectly affect the various downhole equipment and tools that may come into contact with the chemicals/fluids such as, but not limited to, drill string, coiled tubing, drill pipe, drill collars, mud motors, downhole motors or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The particular embodiments disclosed above are illustrative only, as the present disclosure may be modified and practiced in different but equivalent manners apparent to those skilled in the art having the benefit of the teachings herein. It is, therefore, evident that the particular illustrative embodiments disclosed above may be altered or modified and all such variations are considered within the scope of the present disclosure.

The various elements or steps according to the disclosed elements or steps can be combined advantageously or practiced together in various combinations or sub-combinations of elements or sequences of steps to increase the efficiency and benefits that can be obtained from the disclosure.

It will be appreciated that one or more of the above embodiments may be combined with one or more of the other embodiments, unless explicitly stated otherwise.

The illustrative disclosure can be practiced in the absence of any element or step that is not specifically disclosed or claimed.

Furthermore, no limitations are intended to the details of construction, composition, design, or steps herein shown, other than as described in the claims.

What is claimed is:
1. A method of treating a well comprising:
   (A) forming a fluid comprising:
      (i) a continuous aqueous phase, wherein the continuous aqueous phase has total dissolved solids in a concentration of at least 100,000 mg/l;
      (ii) an alkyl amido alkylamidoalkyl quaternary amine;
      (iii) a polymer, wherein the polymer is water-soluble or water-hydratable; and
      (iv) a crosslinker for the polymer; and
   (B) introducing the fluid into a well.
2. The method according to claim 1, wherein the alkylamidoalkyl quaternary amine is not zwitterionic or amphoteric.
3. The method according to claim 1, wherein the alkylamidoalkyl quaternary amine is of the general formula:

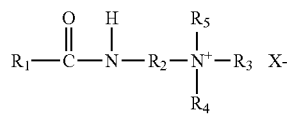

wherein:
   $R_1$ is a straight or branched, saturated or unsaturated, substituted or unsubstituted, non-aromatic alkyl group having 10 to 30 carbon atoms;
   $R_2$ is straight or branched, saturated or unsaturated, substituted or unsubstituted, non-aromatic alkyl group having 2 to 6 carbon atoms;
   $R_3$, $R_4$, and $R_5$ are independently selected from straight or branched, saturated or unsaturated, substituted or unsubstituted, non-aromatic alkyl groups having 1 to 6 carbon atoms and wherein any two of $R_3$, $R_4$, or $R_5$ together with the nitrogen atom to which these groups are bonded can be a heterocyclic ring of up to 6 members; and $X^-$ is a counter ion to the quaternary amine.

4. The method according to claim 3, wherein $R_1$ is hydrophobic, branched, and saturated.

5. The method according to claim 3, wherein $R_1$ is unsubstituted with any group including a heteroatom.

6. The method according to claim 3, wherein $R_2$ is unsubstituted with any group including a heteroatom.

7. The method according to claim 3, wherein $R_2$ is a straight, saturated, and unsubstituted alkyl group having 2 to 6 carbon atoms.

8. The method according to claim 3, wherein $R_3$, $R_4$, and $R_5$ are independently selected from straight, saturated alkyl groups having 1 to 3 carbon atoms.

9. The method according to claim 3, wherein $X^-$ is selected from the group consisting of: halides, oxo ions of phosphorous, sulfur, or chloride, organic anions including but not limited to chlorides, bromides, iodides, oxides of phosphorous, hypochlorides, phosphates, oxides of sulfur, sulfates, sulfites, sulfonates, acetates, cathoxylates, chlorates, perchlorates, salicylates, phthalates, lactates, maleates, glycinates, citrates, citric acid, lactic acid, salicylic acid, phthalic acid, benzoic acid, naphthoic acid, amino acids.

10. The method according to claim 3, wherein X— is selected from the group consisting of: a linear alkyl sulfate, a linear alkyl sulfonate, a linear alpha olefin sulfate, a linear alpha olefin sulfonate, a linear fatty acid sulfonate, a linear sulfur succinate or a mixture thereof.

11. The method according to claim 3, wherein the alkylamidoalkyl quaternary amine is Isostearamidopropyl Ethyldimonium Ethosulfate.

12. The method according to claim 1, wherein the fluid additionally comprises: a linear alkyl sulfate, a linear alkyl sulfonate, a linear alpha olefin sulfate, a linear alpha olefin sulfonate, a linear fatty acid sulfonate, a linear sulfur succinate or a mixture thereof.

13. The method according to claim 1, wherein thy: polymer is selected from the group consisting of guar derivatives and cellulose derivatives, wherein the derivative has anionic groups selected for crosslinking of the polymer.

14. The method according to claim 1, wherein the crosslinker is a transition metal compound having an organic ligand.

15. The method according to claim 1, wherein the pH of the continuous aqueous phase has a pH in the range of about pH 8.5 to about pH 10.

16. The method according to claim 1, wherein the fluid additionally comprises a solvent in the continuous aqueous phase selected from the group consisting of an alcohol, a glycol, and any combination thereof.

17. The method according to claim 1, wherein the fluid additionally comprises a breaker to reduce the viscosity of the fluid in the well.

18. The method according to claim 1, wherein the fluid is introduced into a treatment zone of a subterranean formation at a rate and pressure to create or enhance at least one fracture in the treatment zone.

19. A fluid comprising:
 (i) a continuous aqueous phase, wherein the continuous aqueous phase has total dissolved solids in a concentration of at least 100,000 mg/l;
 (ii) an alkylamidoalkyl quaternary amine;
 (iii) a polymer, wherein the polymer is water-soluble or water-hydratable; and
 (iv) a crosslinker for the polymer.

\* \* \* \* \*